(12) United States Patent
McCann et al.

(10) Patent No.: US 11,632,710 B2
(45) Date of Patent: Apr. 18, 2023

(54) PROVISIONING A DEVICE IN A NETWORK

(71) Applicant: BlackBerry Limited, Waterloo (CA)

(72) Inventors: Stephen McCann, Southampton (GB); Michael Peter Montemurro, Toronto (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1253 days.

(21) Appl. No.: 15/058,545

(22) Filed: Mar. 2, 2016

(65) Prior Publication Data
US 2017/0257819 A1 Sep. 7, 2017

(51) Int. Cl.
| | |
|---|---|
| *H04W 72/04* | (2023.01) |
| *H04W 48/16* | (2009.01) |
| *H04W 48/14* | (2009.01) |
| *H04L 67/02* | (2022.01) |
| *H04L 67/04* | (2022.01) |
| *H04W 12/30* | (2021.01) |
| *H04L 67/56* | (2022.01) |
| *H04W 72/21* | (2023.01) |
| *H04W 12/04* | (2021.01) |
| *H04W 12/08* | (2021.01) |
| *H04W 12/06* | (2021.01) |
| *H04W 48/20* | (2009.01) |
| *H04L 41/0806* | (2022.01) |

(52) U.S. Cl.
CPC ............ *H04W 48/16* (2013.01); *H04L 67/02* (2013.01); *H04L 67/04* (2013.01); *H04L 67/56* (2022.05); *H04W 12/04* (2013.01); *H04W 12/08* (2013.01); *H04W 12/35* (2021.01); *H04W 48/14* (2013.01); *H04W 72/21* (2023.01); *H04L 41/0806* (2013.01); *H04W 12/06* (2013.01); *H04W 48/20* (2013.01)

(58) Field of Classification Search
CPC ..... H04W 48/16; H04W 12/08; H04W 12/04; H04W 72/0413; H04W 12/35; H04W 48/14; H04W 12/06; H04W 48/20; H04L 67/02; H04L 67/04; H04L 67/28; H04L 41/0806
See application file for complete search history.

(56) References Cited

U.S. PATENT DOCUMENTS

| 8,619,735 B2 | 12/2013 | Montemurro et al. |
| 2008/0060066 A1 | 3/2008 | Wynn |

(Continued)

FOREIGN PATENT DOCUMENTS

| GB | 2518620 A | * | 4/2015 | ............... G07C 9/00 |
| GB | 2518620 A | | 4/2015 | |

OTHER PUBLICATIONS

European Patent Office, International Search Report and Written Opinion for PCT/EP2017/053566 dated May 10, 2017 (15 pages).

(Continued)

*Primary Examiner* — Charles C Jiang
*Assistant Examiner* — Voster Preval
(74) *Attorney, Agent, or Firm* — Trop, Pruner & Hu, P.C.

(57) ABSTRACT

In some examples, a headless device that is without an available user interface and that is to be provisioned for access to a network receives information relating to provisioning of the headless device from a network node. The headless device sends, to a mediator device with a user interface, at least a portion of the received information. The headless device receives, from the mediator device, information to proceed with the provisioning of the headless device.

20 Claims, 7 Drawing Sheets

(56) References Cited

U.S. PATENT DOCUMENTS

| | | | | |
|---|---|---|---|---|
| 2013/0276076 A1* | 10/2013 | Gupta | ................... | H04N 19/428 726/5 |
| 2014/0241271 A1* | 8/2014 | Jung | ....................... | H04W 8/26 370/329 |
| 2015/0146706 A1 | 5/2015 | Goluboff | | |
| 2015/0180978 A1* | 6/2015 | Canpolat | ................. | H04L 67/02 370/329 |
| 2015/0229475 A1* | 8/2015 | Benoit | ..................... | H04L 63/20 713/168 |
| 2015/0264051 A1 | 9/2015 | Hoggan | | |
| 2015/0296377 A1* | 10/2015 | Sheu | ..................... | H04W 12/06 380/279 |
| 2016/0080351 A1* | 3/2016 | Chu | ....................... | H04L 63/105 726/7 |
| 2016/0088026 A1* | 3/2016 | Mohamad Abdul | .. | H04W 12/06 726/1 |
| 2016/0150412 A1* | 5/2016 | Liu | ........................ | G06F 16/334 370/338 |
| 2016/0270020 A1* | 9/2016 | Adrangi | .................. | H04L 67/02 |
| 2016/0360407 A1* | 12/2016 | Benoit | ................... | H04W 12/06 |
| 2017/0111783 A1* | 4/2017 | Zhang | ..................... | H04W 8/20 |
| 2017/0208070 A1* | 7/2017 | Burns | ..................... | G06Q 10/00 |
| 2018/0084403 A1* | 3/2018 | Kode | ....................... | H04W 8/183 |
| 2018/0176771 A1* | 6/2018 | Yang | ..................... | H04W 12/06 |

OTHER PUBLICATIONS

Wi-Fi Alliance, Wi-Fi Certified Passpoint, Hotspot 2.0 (Release 2) Technical Specification, Version 1.0.0, "A Solution for Next Generation Wi-Fi Hotspots"; 2014; 207 pages.

IEEE, Standard for Information Technology—Telecommunications and Information Exchange Between Systems Local and Metropolitan area networks—Specific Requirements; Part 11: "Wireless LAN Medium Access control (MAC) and Physical Layer (PHY) Specifications"; 2012; 2,793 pages.

Wikipedia; "Captive Portal"; https://web.archive.org/web/20150202195543/https://en.wikipedia.org/wiki/Captive_portal; Feb. 2, 2015; 6 pages.

Stephen McCann et al., U.S. Appl. No. 14/794,191 entitled Link Indication Referring to Content for Presenting at a Mobile Device filed Jul. 8, 2015 (44 pages).

3GPP TS 24.234 V12.2.0 Technical Specification 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 12) Mar. 2015 (40 pages).

WiFi Alliance (http://www.wi-fi.org/who-we-are/current-work-areas) Who We Are—Current Work Areas—Early Devleopment, Applications Service Platform 2.0 downloaded Mar. 2, 2016 (7 pages).

Wiki—(https://wiki.iotivity.org/multi-phy_easy_setup) Lotivity—Multi-Phy Easy Setup last modified Jan. 21, 2016 (7 pages).

WiFi Alliance (http://www.wi-fi.org/certification/programs) Certification—Programs downloaded Mar. 2, 2016 (4 pages).

WiFi Alliance (http://www.wi-fi.org/news-events/newsroom/wi-fi-alliance-announces-certification-plans-for-ieee-80211g-wireless-lan) Wi-Fi Alliance Announces Certification Plans for IEEE 802.11g Wireless LAN Products, Feb. 25, 2003 (3 pages).

European Patent Office, Communication pursuant to Article 94(3) EPC for Appl. No. 17706198.3 dated May 25, 2020 (4 pages).

Canadian Patent Office, Examination Report for Appl. No. 3,009,298 dated Feb. 13, 2023 (5 pages).

* cited by examiner

PROVISIONING A DEVICE IN A NETWORK

BACKGROUND

A captive portal is a network service that forces a mobile device to be authorized and authenticated prior to establishing network access. The captive portal is often used to present a login page to the user on the mobile device. The foregoing is performed by placing a newly connected mobile device in a walled garden once the mobile device establishes a link with the network, and filtering most, if not all, traffic between the mobile device and the remainder of the network, and redirecting a browser of the mobile device to a web page that includes the login page.

The web page to which the browser is redirected can seek authentication and/or payment (e.g. advice of charge), or can display a use policy (e.g. terms and conditions) that the user is to agree to. Captive portals can be used in a hotel room, in a business center, in an airport, or at another location.

BRIEF DESCRIPTION OF THE DRAWINGS

Some implementations are described with respect to the following figures.

DETAILED DESCRIPTION

Establishing network connectivity by a mobile device with a captive portal can involve a manual process in which a user of the mobile device is prompted to make an input before a mobile device is allowed to connect to a hotspot, or more generally, to a wireless access network. In the ensuing discussion, a "hotspot" can refer to a physical location that includes a wireless access node (or multiple wireless access nodes). A wireless access node is accessible by a mobile device to connect to another network, such as the Internet or other type of network. A "wireless access node" can refer to a communication device (or an arrangement of communication devices) that is able to wirelessly communicate with a mobile device to allow for the mobile device to establish a connection for communication with another network.

Examples of a wireless access node can include any of the following: an access point (AP) of a wireless local area network (WLAN), a router, a gateway, and so forth. In some examples, a hotspot can use Wi-Fi technology, as provided by the Institute of Electronics and Electrical Engineers (IEEE) 802.11 protocol or a Wi-Fi Alliance specification. In other examples, a hotspot can use other types of wireless communication technologies.

A "mobile device" can refer to any type of electronic device that uses wireless communications. As examples, a mobile device can include any of the following: a portable computer, a smart phone, a tablet computer, a game appliance, a personal digital assistant (PDA), a wearable device (e.g. smart watch, smart eyeglasses, etc.), a desktop computer, a vehicle (or an electronic device in a vehicle), a health monitor, or any other type of electronic device that is capable of performing wireless communications in a wireless access network.

In contrast to manual login procedures provided by captive portals, automated hotspot login procedures can be used, such as those provided by the WI-FI Alliance Passpoint program (also referred to as Hotspot 2.0 as described in the WI-FI Alliance Hotspot 2.0 Release 2, Technical Specification, Version 1.0.0, August 2014). In other examples, other versions of Passpoint can be employed. An automated hotspot login procedure allows a mobile device to log into (or more generally, to establish connectivity) with a wireless access node of a hotspot without any indication or manual involvement to the user of the mobile device. This means that the user may not notice the hotspot connection occurring. However, some amount of configuration (provisioning) of the mobile device has to be provided prior to automated hotspot login procedure occurring for the first time.

Online Sign Up (OSU) provided by Passpoint is the process by which a mobile device registers with a service provider (SP) or a hotspot operator, enabling a user to select a plan for obtaining network access. As used herein, a service provider refers to a service provider or a hotspot operator. As part of the OSU procedure, the mobile device is provisioned with security credentials (e.g. user names and passwords, encryption keys, or other credentials) used to securely connect to an access network. The security credentials can be used by the mobile device to perform an automated login procedure to the wireless access network.

More generally, "provisioning" a mobile device can refer to providing the mobile device with specific information to allow the mobile device to establish connectivity with a wireless access network node so that the mobile device can perform communications through the wireless access network node with another endpoint.

In alternative examples, instead of using Passpoint procedures to provision a mobile device, a different technique can be employed, such as that provided by the Wi-Fi Alliance Device Provisioning Protocol (DPP). In other examples, other versions of DPP can be employed. DPP provides a provisioning scheme in which a fixed network infrastructure to provide provisioning of mobile devices does not have to be provided. DPP can be considered as a lighter weight alternative to Passpoint OSU, which employs the following network infrastructure entities, for example: an Authentication, Authorization, and Accounting (AAA) server, a policy database, a web server, and/or other network infrastructure entities.

DPP can avoid the use of an AAA server, a policy database, a web server, and/or other network infrastructure entities. DPP can use ephemeral keys (referred to as a DPP key or DPP public key) between devices to perform provisioning, and as a result, DPP does not have to rely on use of network servers. The DPP key is used to encrypt and decrypt data exchanged between a DPP configurator and an electronic device to be provisioned.

DPP enables a configurator device (which is a gatekeeper) to provision other devices (enrollee devices) within a network, where the enrollee devices can include stations such as mobile devices or other user devices, access points (APs), or other types of devices. Any of a station, AP, or other device can also operate as a configurator device (referred to as a "DPP configurator"). Devices that have yet to be configured by the DPP configurator are called enrollee devices, and devices that have been configured by the DPP configurator are called peers. An AP is a special type of peer.

In some examples, a DPP configurator can be a mobile device that has a rich user interface (UI). In the DPP procedure, the DPP configurator first authenticates the enrollee device and then may provision the enrollee device. The UI of the DPP configurator can be used to allow manual steps as part of this overall procedure. Provisioning includes the setup of the enrollee device and the capability to provide a third party introduction for connectivity to other devices managed by the DPP configurator.

In the ensuing discussion, any device that is to be provisioned (such as by using Passpoint, DPP, or any other protocol) is referred to an "enrollee device," which can be a mobile device, a network device such as an AP, or any other type of device that is to communicate in a network. The network in which the enrollee device is to communicate can include a wireless access network, such as a WLAN, or any other type of network. WLAN communications in a WLAN can be according to the IEEE 802.11 protocol. In other examples, communications in a network can be according to other protocols.

1. Issues with Passpoint Provisioning

A "headless device" can refer to an electronic device that is without an available user interface (UI). For example, the headless device can be without an available display and/or other input device that allows a user to interact with the device to provide user input. A headless device may also be a device with a UI, but the UI is situated in an inaccessible place for a user to access (e.g. embedded in a large piece of equipment or inside a shipping container) or where the UI is only for display purposes (e.g. for indication only on a large piece of industrial machinery). A UI can refer to any or some combination of the following: a display and an input device (such as a touchpad, keyboard, pointer device, touch screen, etc.). As used herein, a headless device "without an available UI" is a device that is missing a UI, or that has a UI that is either inaccessible or cannot be used for user input during provisioning of the headless device.

Passpoint OSU does not support an enrollee device that is a headless device. According to Passpoint, certain tests are performed on an enrollee device. For example, Passpoint OSU expects that the enrollee device displays, in a UI, an icon (or icons) or a name (or names) of a service provider (or service providers), from which a user is requested to make a selection to perform registration. As another example, during OSU, a browser can be launched in the enrollee device, and a user is expected to interact with the web browser to perform registration and to obtain a security credential. As yet a further example, a user of the enrollee device may be expected to enter a password during OSU.

If an enrollee device is headless, then the foregoing tasks cannot be performed during Passpoint OSU, which can cause the OSU to fail. As a result, headless devices cannot be provisioned using Passpoint OSU using existing techniques.

Moreover, pages displayed by the enrollee device during Passpoint OSU may not be consistent. For example, the pages displayed during OSU may have different layouts, and as a result, an automated program would not be usable to parse an OSU page to extract information in an automated manner without user interaction. For example, a user may be expected to select a subscription plan from multiple subscription plans. It may not be practical to expect a headless device to parse existing subscription descriptions to select a plan from multiple plans, due to inconsistencies in OSU pages.

2. Issues with DPP Provisioning

Although DPP does support provisioning of a headless device by a DPP configurator, the configurator device is assumed to be a device with a UI that is in the possession of a user to allow for the DPP configurator to be used to perform provisioning of an enrollee device. If the DPP configurator is also a headless device then DPP provisioning cannot proceed. DPP relies on a peer device obtaining the public key of the other device in order to authenticate. A headless device is limited in its ability to verify the public key that represents the identity of the DPP configurator.

3. Provisioning Architecture and General Process

In accordance with some implementations of the present disclosure, a mediator device is used during provisioning of an enrollee device, which can be a headless device. The provisioning can be performed as part of a Passpoint OSU procedure, a DPP procedure, or a procedure according to a different protocol.

Figure 1:
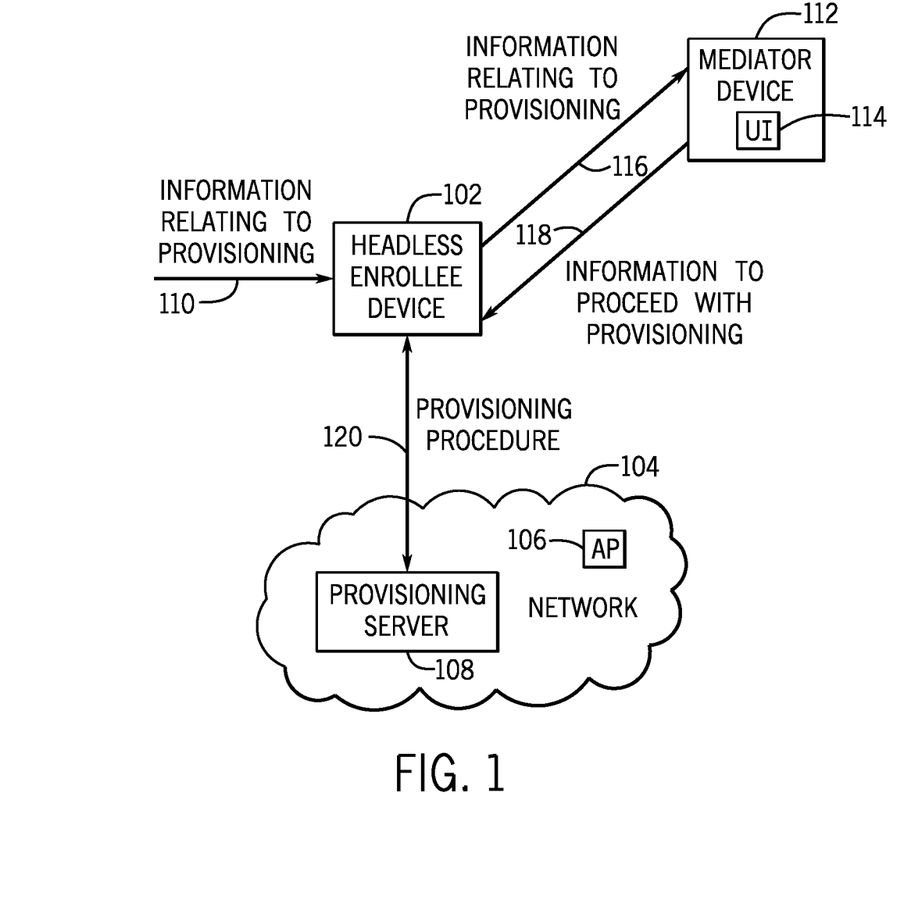
FIG. 1 is a block diagram of an example network arrangement that supports provisioning of enrollee devices according to some implementations.

FIG. 1 shows an example arrangement that supports provisioning of a headless enrollee device (or more simply "headless device") 102 to allow the headless device 102 to communicate in a network 104, which can be a public network such as a WLAN or any other type of network. The network 104 can include an AP 106 (or multiple APs) and a provisioning server 108. The provisioning server 108 can be an OSU server that operates according to Passpoint. Alternatively, the provisioning server 108 can be a DPP configurator. In other examples, the provisioning server 108 can operate according to a different protocol. In other examples, the network 104 can include multiple provisioning servers.

In further examples, the headless device may be within range of multiple networks provided by respective different service providers. Each of such multiple networks can include a respective provisioning server, and the headless device 102 (in combination with a mediator device 112) can select from among the multiple provisioning servers.

When the headless device 102 initially starts or first appears within range of the network 104 (or more specifically, within range of an AP 106 in the network 104), a procedure to setup the headless device 102 for communications in the network 104 is triggered. As part of this procedure, the headless device 102 receives information 110 relating to provisioning, which can be from a network node such as the AP 106, for example. The information 110 relating to provisioning can include an identifier of an available provisioning server (e.g. an OSU server or a DPP configurator) or identifiers of available provisioning servers (e.g. OSU servers or DPP configurators). The information 110 relating to provisioning can also include an information element indicating whether a provisioning server(s) is (are) available. In further examples, the information 110 relating to provisioning can include other information that is usable by the headless device 102 to perform provisioning.

To support provisioning of the headless device 102 in the network 104, a connection (referred to as a tether) can be established between the headless device 102 and the mediator device 112. The mediator device 112 includes a UI 114, which can include any or some combination of the following: a display and an input device (such as a keyboard, a touchpad, a pointer device, a touch screen, etc.). The mediator device 112 can be a mobile device, or alternatively, the mediator device 112 can be a device whose location is fixed during use. The connection established between the headless device 102 and the mediator device 112 can be a wireless connection. The connection between the headless device 102 and the mediator device 112 allows the mediator device 112 to perform remote control of the headless device 102 for purposes of provisioning the headless device 102 in the network 104.

The connection between the headless device 102 and the mediator device 112 can be any of the following types of connections: a Bluetooth connection, a WLAN connection, a Wi-Fi direct connection, a Universal Serial Bus (USB) connection, an Ethernet connection, a ZigBee connection (ZigBee is a protocol provided by the ZigBee Alliance), a Long-Term Evolution (LTE) or Evolved Universal Mobile Telecommunications System Terrestrial Radio Access (E-UTRA) connection (provided by the Third Generation Partnership Project or 3GPP), a Peer-to-Peer (P2P) WLAN connection, and so forth. In examples where the connection between the headless device 102 and the mediator device 112 is a WLAN connection, the headless device 102 is configured to be able to perform concurrent operation in the tether basic service set (BSS) and communication with the provisioning server 108. A BSS includes zero or more non-AP stations (STAs) (such as mobile devices or other terminal devices) that are connected to the same wireless AP. Once the provisioning is complete, the headless device can join a different BSS (e.g. a production BSS in which the headless device 102 is able to perform communications in the network 104 with other endpoints), and can disconnect from the tether BSS. Alternatively, the headless device 102 can stay connected to the tethered BSS to receive additional configuration information for the headless device 102. In cases where the headless device 102 is a virtual private network (VPN) client, the headless device 102 can continue to operate on the same or a different BSS.

After receiving the information 110 relating to provisioning, the headless device 102 then passes at least a portion of the information 110 relating to provisioning as information 116 relating to provisioning to the mediator device 112. Part of the information 116 sent from the headless device 102 to the mediator device 112 can be presented (e.g. displayed) in the UI 114, to allow a user of the mediator device 112 to make a selection or perform other interaction in response to the presented information in the UI 114. In response to the selection or other interaction by the user with respect to the information presented in the UI 114, the mediator device 112 sends information 118 to the headless device 102, where the information 118 includes information to indicate to the headless device to proceed with provisioning. For example, the information 118 can include an identifier of a selected service provider. As noted above, in some examples, the information 116 sent from the headless device 102 to the mediator device 112 can include a list of multiple service providers, and the UI 114 of the mediator device 112 can present such service providers as icons or names. The user at the mediator device 112 can select one of the service providers, and this selection is passed as information 118 to the headless device 102. In some examples, the list multiple service providers (including all icons or names) can also be passed as information 118 to the headless device 102 for storage as future reference.

In other examples, the information 118 sent from the mediator device 112 to the headless device 102 can include information indicating that the user of the mediator device 112 has confirmed that the provisioning is to proceed. For example, the UI 114 can present a dialog box or other type of UI screen including a first UI element to confirm proceeding with the provisioning, and a second UI element to cancel the provisioning of the headless device 102.

In response to the information 118 received from the mediator device 112, the headless device 102 can perform a provisioning procedure 120 with the provisioning server 108. The provisioning procedure 120 can be part of a Passpoint OSU procedure, a DPP procedure, or any other type of procedure to setup the headless device 102 to enable communication in the network 104. Provisioning the headless device 102 can include providing a security credential to the headless device 102, as well as other information to the headless device 102, to allow the headless device 102 to communicate in the network 104, such as by performing an automated login procedure in the network 104 so that the headless device 102 can be allowed to perform communications in the network 104.

Figure 2:
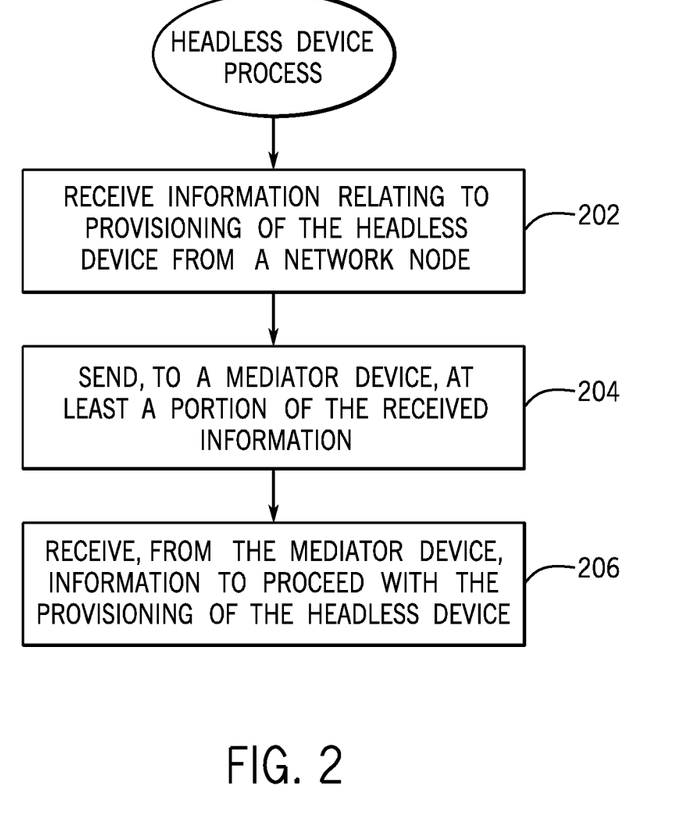
FIG. 2 is a flow diagram of an example process of provisioning an enrollee device according to some implementations.

FIG. 2 is a flow diagram of a process that can be performed by the headless device 102 that is without a UI and that is to be provisioned for access to the network 104. The headless device 102 receives (at 202) information relating to provisioning of the headless device from a network node, such as the AP 106. The headless device 102 sends (at 204), to the mediator device 112 with the UI 114, at least a portion of the received information. The headless device 102 then receives (at 206), from the mediator device 112, information to proceed with the provisioning of the headless device 102.

In some examples of the present disclosure, the headless device 102 can track its own state, so that the headless device 102 knows when to enter a provisioning mode as opposed to an operational mode. Thus, the headless device 102 can have a provisioned state and an un-provisioned state. In the un-provisioned state, the headless device 102 is not yet provisioned to communicate in the network 104. After provisioning is performed, the headless device 102 can transition to the provisioned state. In further examples, a subscription of the headless device 102 can be revoked, to cause reset of the headless device 102 so that the headless device 102 can switch from the provisioned state to the un-provisioned state.

In some examples, the headless device 102 can also enter a provisioning state, in which the headless device 102 can perform the process of provisioning the headless device 102.

4. Provisioning of Headless Device According to Passpoint

Figure 3:
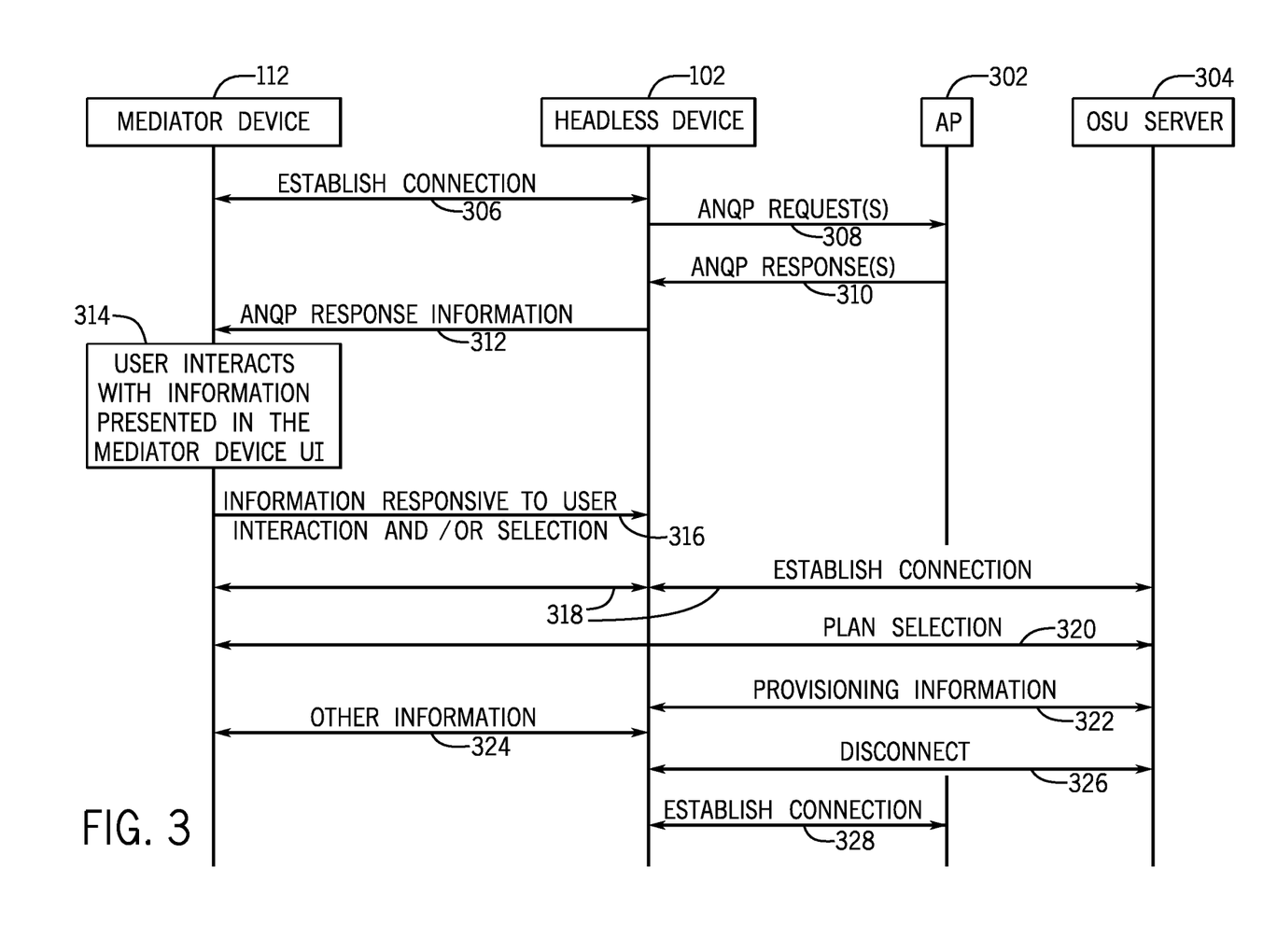
FIG. 3 is a flow diagram of an example process of provisioning an enrollee device according to Passpoint, according to further implementations.

FIG. 3 is a message flow diagram of a procedure according to some implementations of the present disclosure that is according to Passpoint and that can be used to provision a headless device, such as the headless device 102 of FIG. 1. The following provides a description of each task depicted in FIG. 3.

Task 306: The mediator device 112 establishes a connection with the headless device 102. The headless device 102 now enters a provisioning state from an un-provisioned state.

Task 308: The headless device 102 sends, to a network AP 302 of the network (e.g. network 104 in FIG. 1), an Access Network Query Protocol (ANQP) request (or multiple ANQP requests) for OSU provider information and additional information. The OSU provider information can include an identifier of one OSU provider, or a list of identifiers of multiple OSU providers that are available to the headless device 102 to access. The additional information can include an indication of whether an OSU provider is available, and/or other information. The identifier of a OSU provider can also be the identifier of a service provider or hotspot operator.

Task 310: In response to the ANQP request (or multiple ANQP requests), the network AP 302 obtains the OSU Provider List and additional information locally, and then the network AP 302 sends an ANQP response (or multiple ANQP responses) back to the headless device 102. The ANQP response(s) contain(s) the OSU provider information and additional information.

Task 312: At least a portion of the information in the ANQP response(s) is sent by the headless device 102 to the mediator device 112. The information sent from the headless device 102 to the mediator device 112 can be encapsulated in a new frame type for transmission over the connection between the headless device 102 and the mediator device 112, as discussed further below. The new frames can be transported using a secure protocol or other protocol over Hypertext Transfer Protocol (HTTP) (e.g. using HTTP GET/SET/POST messages), or over User Datagram Protocol (UDP).

In some examples, the information sent from the headless device 102 to the mediator device 112 can include the OSU provider information and the additional information. In addition, the information sent from the headless device 102 to the mediator device 112 can optionally further include the headless device identity, such as a Medium Access Control (MAC) address, a serial number, or other identity information.

Task 314: The mediator device 112 presents (e.g. displays) the information received from the headless device 102 in the UI 114 of the mediator device 112. For example, the presented information can include an icon(s) or name(s) of an available OSU provider(s). If the mediator device 112 receives an indication from the UI 114 (such as in response to user selection or interaction) that online signup for a subscription is desired, and a selection has been made, the mediator device continues with task 316. Otherwise, the mediator device 112 stops the online signup and sends the headless device 102 an indication to terminate the online signup.

Task 316: The mediator device 112 sends, to the headless device 102, information responsive to the user interaction and/or selection in the UI 114 of the mediator device, where such information can include the selected OSU provider information (to identify the selected OSU provider) and possibly other information.

Task 318: In response to the information received (at 316) from the mediator device 112, the headless device 102 connects to an OSU server 304 of the user-selected OSU provider, as identified by the selected OSU information. Although not shown in FIG. 3, the connection between the headless device 102 and the OSU server 304 can pass through an AP for the OSU server 304. An end to end connection is established between the OSU server 304 and the mediator device 112, using the two separate connections (i.e. the connection between the mediator device 112 and the headless device 102, and the connection between the headless device 102 and the OSU AP.

Task 320: Subscription plan selection can then proceed between the mediator device 112 and the OSU server 304, according to Passpoint. In some examples, the user at the mediator device 112, using the UI 114, can provide information to be used by the OSU server 304 to sign up for a subscription. In some examples, multiple subscription plans (e.g. a first plan that connects the user to the network for 24 hours, a second plan that connects the user to the network for 48 hours, etc.) can be presented in the UI 114 at the mediator device 112. The user can select one of the subscription plans presented in the UI 114.

Task 322: When the subscription plan selection is complete, the OSU server 304 can send provisioning information to the headless device 102. The provisioning information can include a credential (e.g. certificate and/or username/password) and optionally a network-selection policy. The headless device 102 is provisioned according to the provisioning information. In other examples, the provisioning information may be relayed to the headless device 102 via the mediator device 112 from the OSU server 304.

Task 324: Other information can be relayed between the mediator device 112 to the headless device 102. For example, the selection of a subscription plan by the mediator device 112 may be based on extra information from the headless device 102 (e.g. the identity of the headless device 102). In addition, information relating to power levels of both the mediator device 112 and the headless device 102 may be employed to complete task 320, in which case the exchange of the other information (at 324) can be performed at task 320 or prior to task 320. As further examples, the headless device 102 can send to the mediator device 112 an indication that provisioning of the headless device 102 is complete.

Task 326: Once the provisioning task (322) has been completed and any other information (324) has been exchanged between the mediator device 112 and the headless device 102, the headless device 102 sends a message to disconnect from the OSU AP. The headless device 102 now enters a provisioned state. If the provisioning information within headless device 102 has to be reset, the headless device 102 can change back to the provisioning state" and repeat the sequence according to FIG. 3.

Task 328: The headless device 102 can then connect to the network AP 302 according to the provisioning performed at 322. Once connected to the network AP 302, the headless device 102 can perform communications through the network AP 302 with another endpoint. In some examples, the mediator device 112 can then disconnect from the headless device 102.

5. New Frame Formats

Although specific frame formats are provided below, it is noted that in other examples, alternative frame formats can be used.

As discussed above in connection with task 312 of FIG. 3, information included in the ANQP response(s) sent by the network AP 302 to the headless device 102 can be encapsulated in a frame according to a new frame format, where the frame encapsulating the information is sent by the headless device 102 to the mediator device 112. A "new" frame format can refer to a frame format that is not currently defined by current versions of standards.

This frame according to the new frame format can be an Internet Protocol (IP) packet or an Ethernet frame. In some examples, the frame can be secured by the wireless link, such as with Wi-Fi Protected Access 2 (WPA2) Personal using Wi-Fi Direct.

Figure 4:
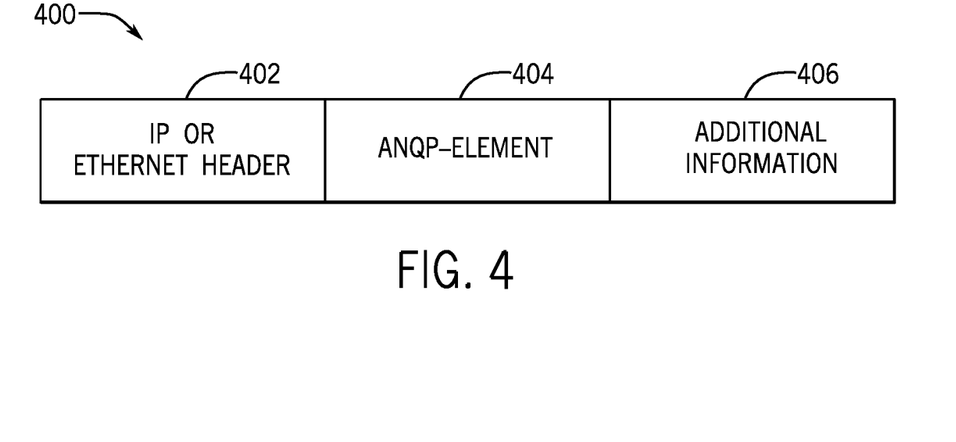
FIGS. 4-6 are schematic diagrams of example frame formats according to some implementations.

An example frame 400 according to the new frame format is shown in FIG. 4. The frame 400 includes several fields, including an IP or Ethernet header field 402 (that includes header information of an IP packet or Ethernet frame), an ANQP-element field 404 (that includes OSU provider information, such as a list of OSU providers), and an additional information field 406. Each field can be of variable length, and can include a length information element to indicate the length of the field. The Additional Information field 406 can be optional.

An example of the format of the ANQP-element field 404 is described in WI-FI Alliance Hotspot 2.0 Release 2, Technical Specification, Version 1.0.0, August 2014.

The additional information field 406 can include any or some combination of the following information:
  identity (MAC address, serial number) of the enrollee device,
  date of manufacture of the enrollee device,
  date of last provisioning or revocation of settings of the enrollee device,
  current power levels of the enrollee device,
  control codes of the enrollee device,
  error codes of the enrollee device, and
  a provisioning data structure (e.g. Extensible Markup Language or XML manage object) containing information sent by the OSU server.

As discussed above, in task 316 of FIG. 3, the selected OSU provider information that has been selected by the mediator device 112 is transmitted to the headless device 102. A frame carrying the selected OSU provider information can be an IP packet or Ethernet frame, as secured by, for example, WPA2 Personal using Wi-Fi Direct.

Figure 5:
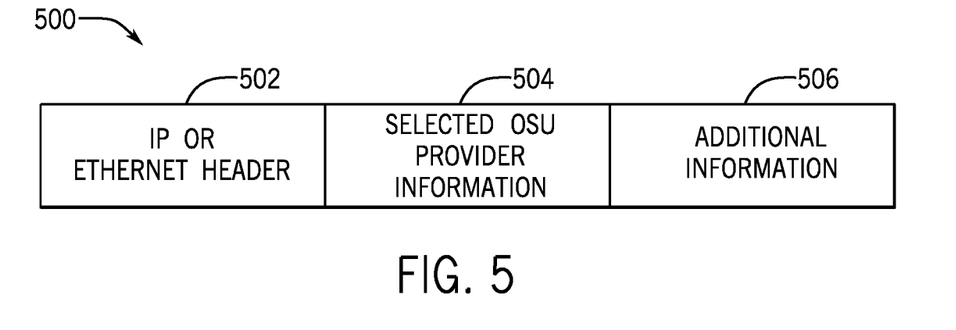

An example of such a frame is shown as frame 500 in FIG. 5. The frame 500 includes an IP or Ethernet header field 502, a selected OSU provider field 504 (that carries the selected OSU provider information), and an additional information field 506.

Each field of the fields 502, 504, and 506 can be of variable length and can include a length information element to indicate the length of the field. The additional information field 506 can be optional and can have the format similar to the format of the additional information field 406 discussed above.

Figure 6:
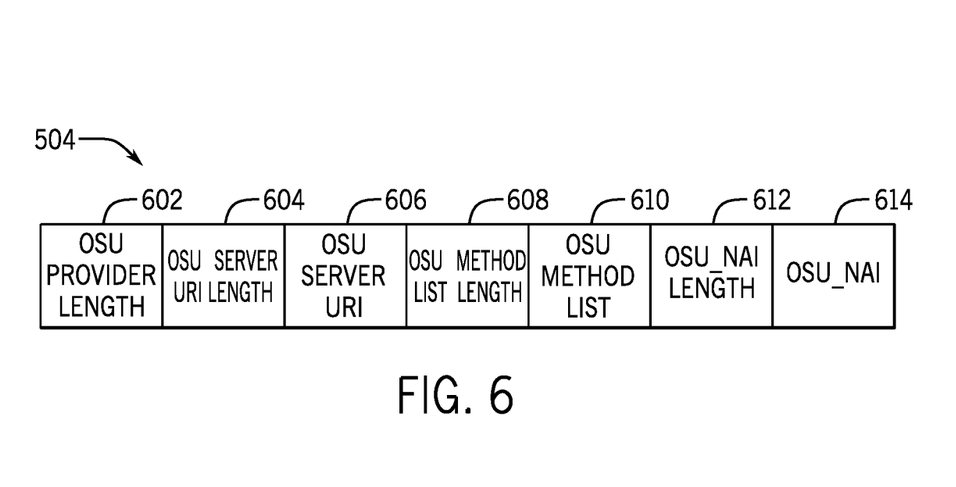

In some examples, the format of the selected OSU information field 404 is shown in FIG. 6. The selected OSU information field 404 includes an OSU provider length sub-field 602, an OSU server uniform resource identifier (URI) length sub-field 604, an OSU server URI sub-field 606, an OSU method list length sub-field 608, an OSU method list sub-field 610, an OSU_NAI length sub-field 612, and an OSU_NAI sub-field 614.

The format and description of these sub-fields in FIG. 6 are provided in WI-FI Alliance Hotspot 2.0 Release 2, Technical Specification, Version 1.0.0, August 2014.

Figure 7:
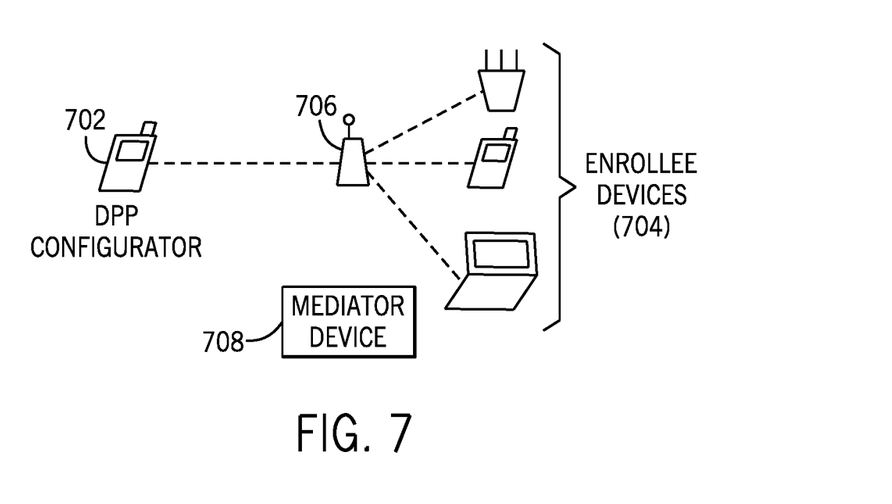
FIG. 7 is a block diagram of an example arrangement to provision enrollee devices using a Device Provisioning Protocol (DPP) configurator, according to alternative implementations.

6. Provisioning of an Enrollee Device using a Mediator Device Associated with the Enrollee Device As discussed further above, instead of using Passpoint to provision enrollee devices, DPP can be used instead. As shown in FIG. 7, with DPP, a DPP configurator 702 can be used to perform provisioning of various enrollee devices 704. The DPP configurator 702 can be a mobile device such as a smart phone, a tablet computer, a notebook computer, and so forth. The DPP configurator 702 and the enrollee devices 706 are able to communicate with an AP 706, such as an AP in a WLAN or other type of wireless network. Alternatively, instead of an AP in a WLAN or other network infrastructure, the AP 706 can be a peer device, such as a Wi-Fi Direct group owner or other device. Wi-Fi Direct allows a device to find nearby Wi-Fi Direct devices and form a Wi-Fi Direct group to communicate over a peer-to-peer link without wireless APs in the infrastructure mode. In a Wi-Fi Direct group, the group owner works as an AP in the Wi-Fi infrastructure mode and the other devices join the group as clients.

As discussed further above, DPP relies on a peer device obtaining the public key of the other device in order to authenticate. An enrollee device 704 that is a headless device is limited in its ability to verify the public key that represents the identity of the DPP configurator. As further shown in FIG. 7, a mediator device 708 that is trusted by the headless enrollee device (704) can obtain the public key and verify the identity of the DPP configurator 702 (through the headless enrollee device 704). The mediator device 708 is associated with the enrollee device 704 in that the mediator device 708 establishes a connection with the enrollee device 704. In accordance with some implementations of the present disclosure, the mediator device 708 can pass the public key to the headless enrollee device 704.

The mediator device 708, which has a UI, can initiate the DPP provisioning procedure, such as by using a camera of the mediator device 708 to scan a code (e.g. QR code) associated with the DPP configurator 702. For example, a user at the mediator device 708 can use the UI to activate the camera. Alternatively, the mediator device 708 can be used to cause the headless enrollee device 704 to activate a camera of the headless device 704 to capture the code associated with the DPP configurator 702. The captured code can include the DPP public key (i.e. the public key of the DPP configurator 702), for example.

In other examples, the user at the mediator device 708 can use the UI of the mediator device 708 to enter the DPP public key, where the user-entered public key can be passed to the headless enrollee device 704. As yet a further example, the mediator device 708 can store the DPP public key, and can pass the stored public key to the headless enrollee device 704 when a connection is established between the mediator device 708 and the headless enrollee device 704.

Figure 8:
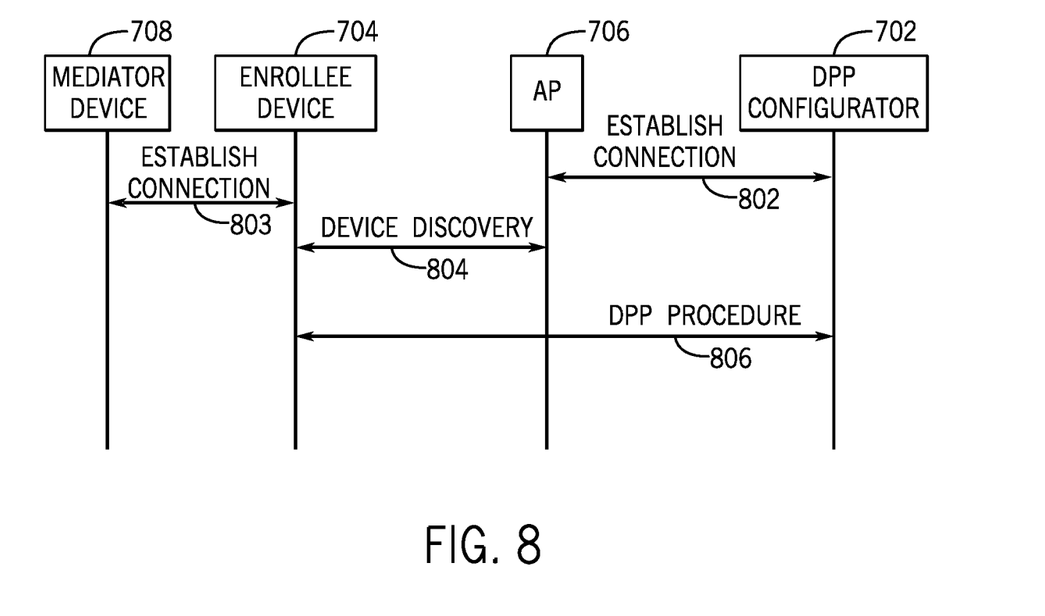
FIG. 8 is a flow diagram of an example process of provisioning an enrollee device using the arrangement of FIG. 7.

FIG. 8 is a message flow diagram that performs provisioning of an enrollee device 704, which can be a headless device without a UI, or alternatively, can be an electronic device with a UI. In FIG. 8, the DPP configurator 702 takes the role of a Passpoint OSU server. Although FIG. 8 shows communications between the enrollee device 704 that passes through the AP 706, it is noted that in other examples, the enrollee device 704 can communicate directly with the DPP configurator 702 without passing through any AP.

The following describes the tasks performed in FIG. 8, in accordance with some implementations.

Task 802: The AP 706 establishes a connection (e.g. a secure connection) with the DPP configurator 702. The AP 706 obtains a DPP public key from the DPP configurator 702 (for example, the DPP configurator 702 can transmit the DPP public key from to the AP 706 over the established connection). The AP 706 and DPP configurator 702 may be co-located in the same entity, or separated with a communication link (wireless or wired link) between them.

Task 803: The mediator device 708 can establish a connection with the enrollee device 704. As discussed above, the established connection between the mediator device 708 and the enrollee device 704 can be used to cause the public key of the DPP configurator 702 to be passed to the enrollee device 704, in examples where the enrollee device 704 is a headless device. For example, the mediator device 708 can obtain the DPP public key and pass the DPP public key to the enrollee device 704, or alternatively, the mediator device 708 can send a stored DPP public key to the enrollee device 704. As yet another example, the mediator device 708 can cause the enrollee device 704 to acquire the DPP public key, such as by using a camera of the enrollee device 704 to capture a code that includes the DPP public key.

Task 804: The enrollee device 704 in a provisioning state performs device discovery with the AP 706, to acquire information of the DPP configurator 702. The enrollee device 704 is seeded with some discovery information (possibly at manufacturing time, for example which Wi-Fi bands in operation in a geographic region).

The AP 706 provides a discovery trigger (e.g. initial information exchange) for the enrollee device 704. For example, the discovery trigger can include a near-field communication (NFC) tag sent by the AP 706 to the enrollee device 704. In other examples, some other trigger, such as any of the following: a trigger using Wi-Fi Aware (provided by the Wi-Fi Alliance) in a near-me area network (NAN), a trigger suing Bluetooth low energy (BLTE), a trigger based on detecting a bar code or quick response (QR) code, and so forth. This discovery trigger allows the DPP public key of the DPP configurator 702 to be transmitted from the AP 706 to the enrollee device 704. The enrollee device 704 and the AP 706 then exchange discovery messages, such as beacons, probes, Wi-Fi Direct messages, fast initial link setup (FILS) messages, ANQP messages, NAN messages, and so forth, so that information can be exchanged between the enrollee device 704 and the DPP configurator 702.

Task 806: The enrollee device 704 and the DPP configurator 702 then performs a DPP procedure. The communications channel between the enrollee device 704 and the DPP configurator 702 can be through the AP 706, or alternatively, can be directly between the enrollee device 704 and the DPP configurator 702. The DPP configurator 702 can be pre-provisioned with the public key of the enrollee device 702 to allow mutual authentication. Otherwise, the enrollee device 702 authenticates the DPP configurator 702. After the DPP procedure successfully completes, the enrollee device 704 is placed into a provisioned state. If the provisioning information within enrollee device 704 has to be reset, the enrollee device 704 can transition back to the provisioning state, and the process of FIG. 8 can be repeated.

Generally, a method includes an enrollee device performing device discovery with an AP that has established a connection with a DPP configurator, to obtain information relating to a DPP configurator, and performing a DPP procedure with the DPP configurator to provision the enrollee device.

The obtained information relating to the DPP configurator includes a key of the DPP configurator.

7. Provisioning of an Enrollee Device According to DPP and using a Mediator Device Associated with the DPP Configurator In examples according to FIG. 7 described above, it is assumed that either that a UI at the DPP configurator 702 does not have to be provided to perform a DPP procedure, or alternatively, the DPP configurator 702 has a UI to allow a user to interact with the DPP configurator 702 when performing the DPP procedure.

Figure 9:
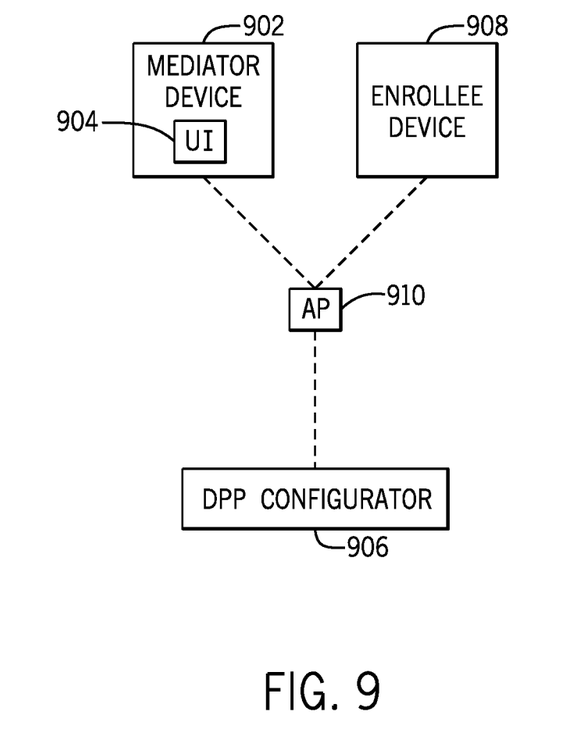
FIG. 9 is a block diagram of an example arrangement to provision enrollee devices using a Device Provisioning Protocol (DPP) configurator and a mediator device, according to further implementations.

In other implementations of the present disclosure, it is assumed that a UI at the DPP configurator has to be provided for the DPP procedure, but that the DPP configurator is without a UI (i.e. is missing a UI or has a UI but the UI is inaccessible or cannot be used to provide user input for provisioning an enrollee device). In such implementations, as shown in FIG. 9, a mediator device 902 (such as a user device) with a UI 904 is provided to interact with a DPP configurator 906 that is without a UI during a DPP procedure, for provisioning an enrollee device 908. Communications among the devices 902, 906, and 908 can occur through an AP 910. In other examples, the mediator device 902 can establish a direct connection with the enrollee device 908 (without passing through any AP). In yet further examples, the enrollee device 908 can establish a direct connection with the DPP configurator 906, without passing through any AP. The enrollee device 908 can be a headless device, or alternatively, can be a device with a UI.

Figure 10:
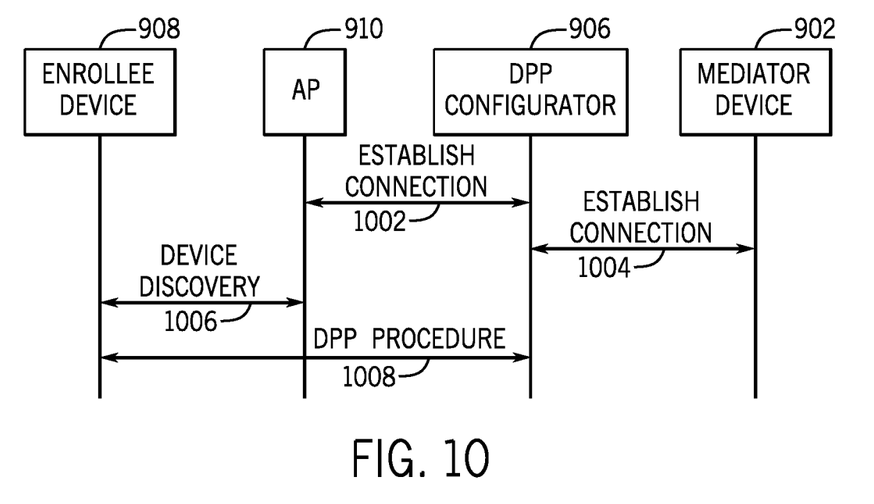
FIG. 10 is a flow diagram of an example process of provisioning an enrollee device using the arrangement of FIG. 9.

FIG. 10 is a flow diagram of a procedure to provision the enrollee device 908 according to DPP that uses the mediator device 902. The mediator device 804 with the UI and connects to the DPP configurator 808 (via the AP 806), so that the mediator device 804 can control the DPP configurator 808.

The following describes the tasks of FIG. 10, in accordance with some examples.

Task 1002: The AP 910 establishes a connection with the DPP configurator 908, and obtains the DPP public key from the DPP configurator 906. The AP 910 and DPP configurator 906 may be co-located in the same entity, or separated with a wired or wireless communications link between them.

Task 1004: The mediator device 902 establishes a connection with the AP 910. Since the AP 910 already has a connection with the DPP configurator 906, the mediator device 902 also has a connection to the DPP configurator 906 and can now provide a UI to the DPP configurator 906. The mediator device 902 and the DPP configurator 906 can work together as a single DPP configurator entity controlling the provisioning process. The connections established at 1002 and 1004 can be secure connections. In other examples, the mediator device 902 can establish a direct connection with the DPP configurator 906.

The mediator device 902 may contact the DPP configurator 906 on behalf of the enrollee device 908 for the purpose of provisioning. The communications can either be direct over a wireless medium or through the AP 910. The mediator device 902 initiates a DPP bootstrapping procedure with the DPP configurator 902, and may provide enrollee information (e.g. the enrollee device's identity) to signal that the mediator device 902 is initiating provisioning on behalf of the enrollee device 908. This then prevents the DPP configurator 906 from trying to provision the mediator device 902 as opposed to the enrollee device 908.

After successful bootstrapping with the DPP configurator 906, the mediator device 902 can then forward the bootstrapping information to the enrollee device 908 so that the enrollee device 908 can initiate DPP provisioning with the DPP configurator 906.

Task 1006: The enrollee device 908 in a provisioning state performs device discovery with the AP 910, similar to task 804 in FIG. 8. In some examples, the enrollee device 908 can also communicate directly with the DPP configurator 906 in performing device discovery. The device discovery can occur between the enrollee device 908 and any other device in radio range, such as the DPP configurator 906 and the AP 910.

Task 1008: The enrollee device 908 can perform a DPP procedure with the DPP configurator 906, to provision the enrollee device 908. Note that the UI 904 of the mediator device 902 is used during the DPP procedure. As examples, the UI 904 can allow a user to enter information relating to provisioning the enrollee device 908.

8. Example System

Figure 11:
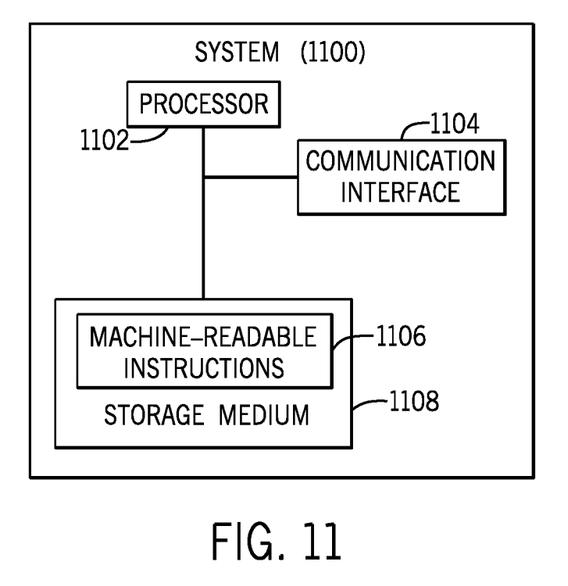
FIG. 11 is a block diagram of an example system that is able to perform provisioning according to some implementations.

FIG. 11 is a block diagram of an example system 1100, which can be an enrollee device, a mediator device, a provisioning server, or any other device of the present disclosure. The system 1100 includes a processor (or multiple processors) 1102, which can be coupled to a communication interface 1104 to communicate with another device. A processor can include a microprocessor, a microcontroller, a programmable integrated circuit, a programmable gate array, or another hardware processing circuit.

The system 1100 further includes a non-transitory machine-readable or computer-readable storage medium (or storage media) 1106, which stores machine-readable instructions 1108 that are executable to perform various tasks as described herein.

The storage medium 1106 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a headless device that is without an available user interface and that is to be provisioned for access to a network, information relating to provisioning of the headless device, the information received from a network node in the network;
sending, by the headless device to a mediator device with a user interface, at least a portion of the received information from the network node, the at least a portion of the received information from the network node sent by the headless device to the mediator device comprising identifiers of provisioning servers;
receiving, by the headless device from the mediator device, information to proceed with the provisioning of the headless device, wherein the information received by the headless device from the mediator device comprises an identifier of a selected provisioning server of the provisioning servers, and is responsive to a selection, from among the provisioning servers, of the selected provisioning server made with respect to the at least a portion of the received information comprising the identifiers of the provisioning servers displayed in the user interface of the mediator device; and
provisioning the headless device using the information received by the headless device from the mediator device, the provisioning comprising configuring the headless device with a security credential that is useable by the headless device to establish connectivity with the network.

2. The method of claim 1, wherein the information received by the headless device from the mediator device responsive to the selection made in the user interface of the mediator device comprises information indicating a confirmation to proceed with the provisioning of the headless device.

3. The method of claim 1, further comprising:
connecting, by the headless device, with the selected provisioning server identified by the information received by the headless device from the mediator device; and
receiving, by the headless device, provisioning information from the selected provisioning server to which the headless device has connected,
wherein the provisioning of the headless device is based on the provisioning information.

4. The method of claim 1, wherein the provisioning servers comprise Device Provisioning Protocol (DPP) configurators, and the selected provisioning server is a selected DPP configurator of the DPP configurators.

5. The method of claim 1, wherein the security credential configured by the provisioning comprises a password.

6. The method of claim 1, wherein the provisioning servers comprise online signup (OSU) providers, and the selected provisioning server is a selected OSU provider of the OSU providers.

7. The method of claim 1, further comprising sending, by the headless device to the mediator device, an identity of the headless device and an indication that the provisioning of the headless device is complete.

8. The method of claim 1, further comprising disconnecting, by the headless device, from the mediator device in response to a completion of the provisioning of the headless device.

9. The method of claim 1, wherein the information received by the headless device from the network node further comprises information selected from among an identity of the headless device, a date of manufacture of the headless device, a date of last provisioning or revocation of settings of the headless device, a current power level, a control code, an error code, and a provisioning data structure.

10. The method of claim 1, further comprising performing, by the headless device, a device provisioning procedure with a Device Provisioning Protocol (DPP) configurator, to provision the headless device, wherein the DPP configurator is the selected provisioning server.

11. The method of claim 10, further comprising receiving, by the headless device, a public key of the DPP configurator from the mediator device.

12. The method of claim 1, wherein the sending of the at least a portion of the received information by the headless device to the mediator device and the receiving of the information to proceed with the provisioning from the mediator device are performed by the headless device while joined to a first basic service set (BSS), the method further comprising:

after completion of the provisioning of the headless device, joining, by the headless device, a different second BSS to perform communications with an endpoint coupled to the network.

13. A mediator device comprising:
a display; and
at least one processor configured to:
receive, from a headless device that is without an available user interface and that is to be provisioned for access to a network, information relating to provisioning of the headless device, the information received by the headless device from a network node in the network, wherein the received information comprises identifiers of provisioning servers;
display the received information comprising the identifiers of the provisioning servers in a user interface in the display;
receive a selection of a provisioning server from among the provisioning servers made in the user interface in the display; and
send, from the mediator device to the headless device, information relating to the selection to cause the provisioning of the headless device to establish connectivity with the network, the information sent by the mediator device to the headless device comprising an identifier of the selected provisioning server.

14. The mediator device of claim 13, wherein the information sent by the mediator device to the headless device further comprises information indicating a confirmation to proceed with the provisioning of the headless device.

15. The mediator device of claim 13, wherein the received information further comprises an identifier of the headless device.

16. The mediator device of claim 13, wherein the at least one processor is configured to receive, from the headless device, a message to disconnect from the mediator device, responsive to the headless device transitioning to a provisioned state.

17. The mediator device of claim 13, wherein the provisioning servers comprise Device Provisioning Protocol (DPP) configurators, and the selected provisioning server is a selected DPP configurator of the DPP configurators.

18. The mediator device of claim 13, wherein the provisioning servers comprise online signup (OSU) providers, and the selected provisioning server is a selected OSU provider of the OSU providers.

19. An enrollee device comprising:
a communication interface; and
at least one processor configured to:
receive, through the communication interface from a network node, information relating to provisioning of the enrollee device for access to a network, wherein the enrollee device is a headless device that is without an available user interface;
send, by the enrollee device to a mediator device with a user interface, at least a portion of the received information from the network node, the at least a portion of the received information from the network node sent by the enrollee device to the mediator device comprising identifiers of provisioning servers;
receive, by the enrollee device from the mediator device, information to proceed with the provisioning of the enrollee device and an identifier of a selected provisioning server of the provisioning servers, wherein the information received by the enrollee device from the mediator device is responsive to a selection, from among the provisioning servers, of the selected provisioning server made with respect to the at least a portion of the received information comprising the identifiers of the provisioning servers displayed in the user interface of the mediator device; and
provision the enrollee device using the information received from the mediator device, the provisioning comprising configuring the enrollee device with a security credential that is useable by the enrollee device to establish connectivity with the network.

20. The enrollee device of claim 19, wherein the provisioning servers comprise Device Provisioning Protocol (DPP) configurators, and the selected provisioning server is a selected DPP configurator of the DPP configurators.

* * * * *